US006262562B1

United States Patent
Cummings et al.

(10) Patent No.: US 6,262,562 B1
(45) Date of Patent: Jul. 17, 2001

(54) INCREASED BATTERY CAPACITY UTILIZING MULTIPLE SMART BATTERIES

(75) Inventors: John A. Cummings; Chrisitan L. Critz; Jeffrey W. Godsted; Leonardo Quintero, all of Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 09/697,480

(22) Filed: Oct. 26, 2000

(51) Int. Cl.[7] ....................................... H02J 7/00
(52) U.S. Cl. ............................................. 320/116
(58) Field of Search ............................... 320/116

(56) References Cited

U.S. PATENT DOCUMENTS

| | | | |
|---|---|---|---|
| 5,327,067 | 7/1994 | Scholder | 320/107 |
| 6,031,354 | * 2/2000 | Wiley et al. | 320/116 |
| 6,172,478 | * 2/2000 | Leppo et al. | 320/116 |

OTHER PUBLICATIONS

System Management Bus Specification, Revision 1.0, Feb. 15, 1995, Copyright© 1996.
System Management Bus Specification, Revision 1.1, Dec. 11, 1998, Copyright© 1996, 1997, 1998.
John Cummings and Barry Kates, "Battery Charge Determination", Nov. 11, 1999, Serial No. 09/434,536 (copy not enclosed).
Greg Fiebrich and Barry Kates, "External Universal Battery Charging Apparatus and Method", Jan. 25, 1999, Serial No. 09/237,009 (copy not enclosed).
John Cummings and Barry Kates, "Adaptive Multiple Battery Charging Apparatus", Jan. 22, 1999, Ser. No. 09/236,165 (copy not enclosed).
John Cummings and Barry Kates, "Reverse Current Protection/Current Overshoot Control for Two Quadrant Battery Chargers", Jan. 22, 1999, Ser. No. 09/236,136 (copy not enclosed) Patent No. # 6137267.
John Cummings and Barry Kates, "Adaptive Fast Charging of Lithium–ion Batteries", Jan. 11, 1999, Ser. No. 09/228,465 (copy not enclosed). Patent No. # 6137265.

* cited by examiner

Primary Examiner—Peter S. Wong
Assistant Examiner—Pia Tibbits
(74) Attorney, Agent, or Firm—Skjerven Morrill MacPherson, LLP

(57) ABSTRACT

A method for allowing a data processing system to use multiple smart batteries substantially simultaneously coupled to the same smart bus, the method including but not limited to detecting at least two smart batteries connected to a smart battery bus; and selectively controlling at least one of the at least two smart batteries via isolation of the smart battery bus clock signal. In one embodiment, circuitry is used to effect the foregoing-described method; the circuitry can be virtually any combination of hardware, software, and/or firmware configured to effect the foregoing-described method depending upon the design choices of the system designer.

20 Claims, 9 Drawing Sheets

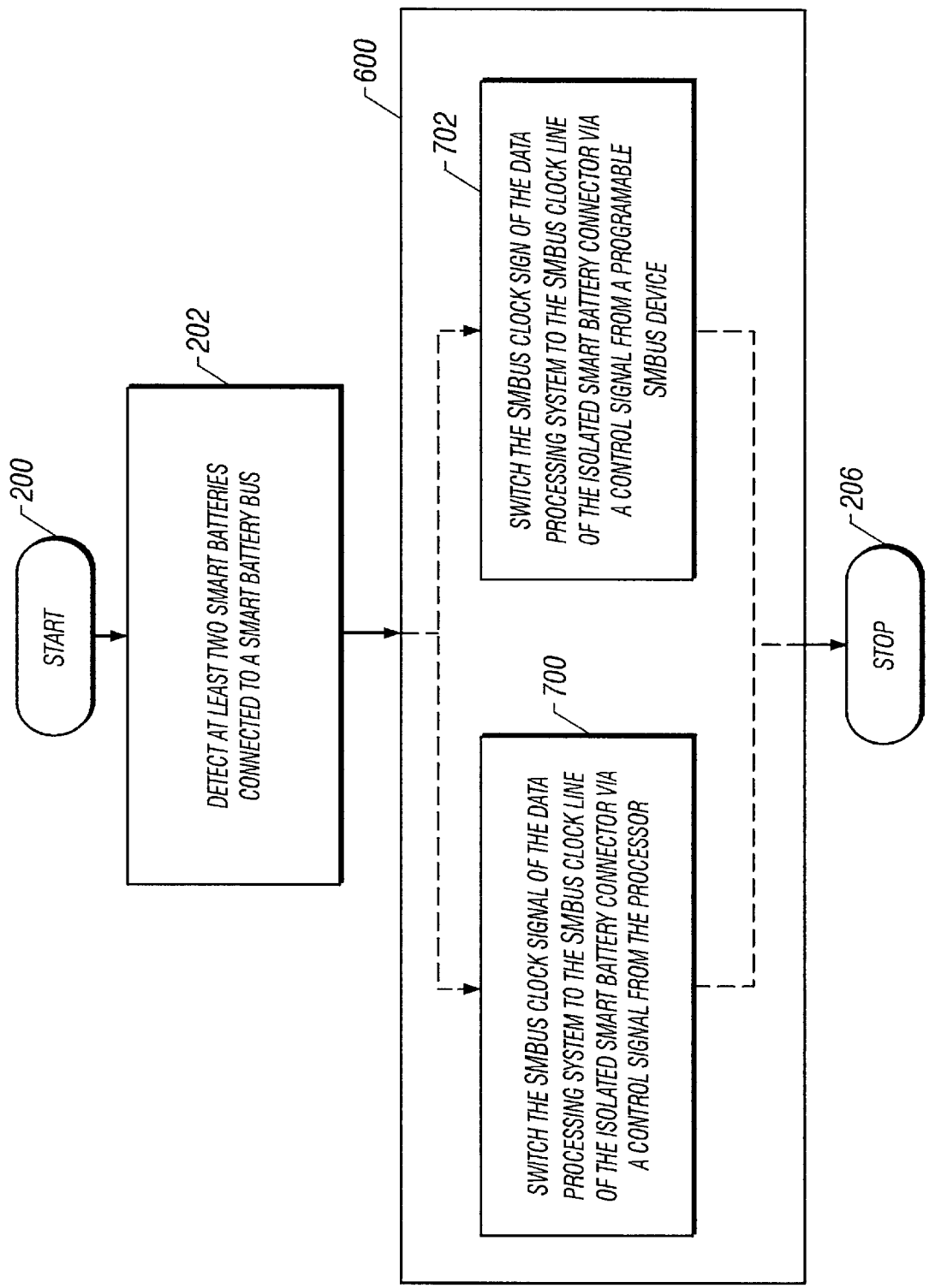

INCREASED BATTERY CAPACITY UTILIZING MULTIPLE SMART BATTERIES

BACKGROUND OF THE INVENTION

1. Field of the Invention

The present invention relates, in general, to data processing systems.

2. Description of the Related Art

Data processing systems are systems that manipulate, process, and store data. Personal computer systems, and their associated subsystems, constitute well known examples of data processing systems.

One particularly popular type of personal computer system is the portable computer system (e.g., laptop, notebook, sub-notebook, and palm-held computer systems). Portable computer systems allow stand-alone computing and typically have their own power supplies, modems, and storage devices.

In order to allow maximum flexibility of use, portable computer systems typically have at least one rechargeable battery. A rechargeable battery is a device whose one or more cells (a cell is a device that converts a store of chemical energy into electrical energy) can be substantially reenergized once the store of chemical energy in the rechargeable battery has been partially or completely depleted. The at least one rechargeable battery generally serves as an internal power supply which allows the portable computer system to be powered up and used even when no external power supplies are present.

All things being relatively equal, the length of time during which a rechargeable battery can effectively power a portable data processing system depends upon the amount of electrical charge stored in the battery. Rechargeable batteries store energy in the form of like electric charges forced into a defined physical volume (often called a charge reservoir). The electrical charges are generally forced into the volume via use of a "battery charger." A battery charger is essentially a "charge pump" which uses power, typically supplied by a an external power supply such as a wall socket, to draw electric charges from a first volume and force the drawn electric charges into a second volume.

Insofar as like charges repel each other and unlike charges attract each other (e.g., a negative charge repels a negative charge and attracts a positive charge, while a positive charge repels a positive charge and attracts a negative charge), circuitry (e.g., portable computer system circuitry) can be electrically connected between the first and second volumes and potential energy associated with the stored charge converted to usable power as the stored charges in the second volume migrate back toward the first volume. For example, a battery charger might first draw positive charges from a negative charge reservoir (or first volume) of a rechargeable battery and force those positive charges into the positive charge reservoir (or second volume) of the rechargeable battery. Thereafter, personal computer power terminals can be electrically connected between the positive and negative terminals of the battery and the potential energy utilized as the positive electric charges in the second (positive terminal) volume migrate, in the form of an electric current, back toward the first (negative terminal) volume. (Those having skill in the art will recognize that it is generally the negative charges that so migrate, but that it is conventional to refer to the positive charges migrating.)

There is an upper physical limit on how much charge can be pumped into a given charge reservoir of a battery (e.g., a charge reservoir internal to a battery, where the charge reservoir is connected to a positive terminal of the battery) without damaging the battery. Once this physical limit has been reached, there is no practicable way of increasing the charge stored in the battery without adding additional physical volume to accept additional charges.

In light of the foregoing, it would seem that if additional battery capacity is desired for some reason (e.g., so that a data processing system can be powered a longer amount of time) it would be a relatively straightforward task to increase battery charge storage capacity (and hence battery life) merely by increasing the physical volume of the battery charge reservoirs in order to accommodate more charge. Unfortunately, such a straightforward operation is not practicable in the modern rechargeable battery environment for at least two reasons: modern rechargeable batteries are mass produced in standard shapes and sizes (i.e., with standard "form factors"), and hence batteries made in custom shapes and sizes (i.e., with custom "form factors") are prohibitively expensive; furthermore, data processing systems wherein rechargeable batteries are generally deployed tend to use smart battery technology.

Modern rechargeable batteries are produced in conformance with form factors. A form factor is a specification of a physical size and shape of a device. Batteries are generally mass-produced in accord with certain industry-wide form factors, and such batteries are generally inexpensive. If a custom form factor for a battery is desired, battery manufacturers generally will produce such custom form factor batteries, but such batteries tend to be far more expensive than the mass produced standard form factor batteries. Given the extreme price pressure in the personal computer environment, such custom form factor batteries are not a practicable option.

Those skilled in the art will also recognize that one way to increase battery capacity is to electrically connect (e.g., in electrical series or parallel) several batteries to get greater aggregate power. Unfortunately, this solution is not practicable due to modern data processing systems' reliance on smart battery technology.

Smart battery technology is a type of technology by which batteries are provided with built-in computational circuitry which informs a data processing system as to a wide range of information about the battery (e.g., charge in the battery, remaining battery life, battery voltage, etc.). An example of smart battery technology appears in the System Management Bus Specification Revision 1.0, Feb. 15, 1995, Copyright© 1996, and System Management Bus Specification Revision 1.1, Dec. 11, 1998, Copyright© 1996, 1997, 1998, standard which are hereby incorporated by reference in their entireties.

Smart batteries are designed to interface with a data processing system through the data processing system's smart battery bus (SMBUS), and because of this there is generally no easy way to increase battery capacity by connecting the batteries in series or parallel as with non-smart batteries. In addition, insofar as most data processing systems are designed to communicate with only one smart battery, there is no practicable way within the art of electrically connecting multiple smart batteries to a data processing system's SMBUS in such a way that will not confuse the data processing system, in that the data processing system is expecting to communicate with only one smart battery.

Even with the foregoing noted difficulties (custom form factor batteries not desirable/data processing system only expecting to communicate with one smart battery) associated with increasing battery capacity over and above that associated with one smart battery, there is a relatively constant need in the art for increased battery capacity (and hence increased battery life). In light of the foregoing discussion, it is apparent that a need exists in the art for a method and system capable of providing increased battery capacity without either (a) requiring the use of custom form factor batteries, or (b) unduly impacting the way in which existing data processing systems make use of smart battery technology.

SUMMARY OF THE INVENTION

The inventors have discovered a method and system capable of providing increased battery capacity without either (a) requiring the use of custom form factor batteries, or (b) unduly impacting the way in which existing data processing systems make use of smart battery technology.

In one embodiment, a method for allowing a data processing system to use multiple smart batteries substantially simultaneously coupled to the same smart bus includes but is not limited to detecting at least two smart batteries connected to a smart battery bus; and selectively controlling at least one of the at least two smart batteries via isolation of the smart battery bus clock signal. In one embodiment, circuitry is used to effect the foregoing-described method; the circuitry can be virtually any combination of hardware, software, and/or firmware configured to effect the foregoing-described method depending upon the design choices of the system designer.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 7 depicts the high-level logic flowchart of FIG. 6 wherein embodiments of method step 700 are shown.

The use of the same reference symbols in different drawings indicates similar or identical items.

DETAILED DESCRIPTION

The following detailed description is intended to be illustrative and should not be taken to be limiting.

The inventors have devised a system and method allowing use of multiple smart batteries substantially simultaneously coupled to the same smart bus. Embodiments of the system and method are described herein.

Figure 1A:
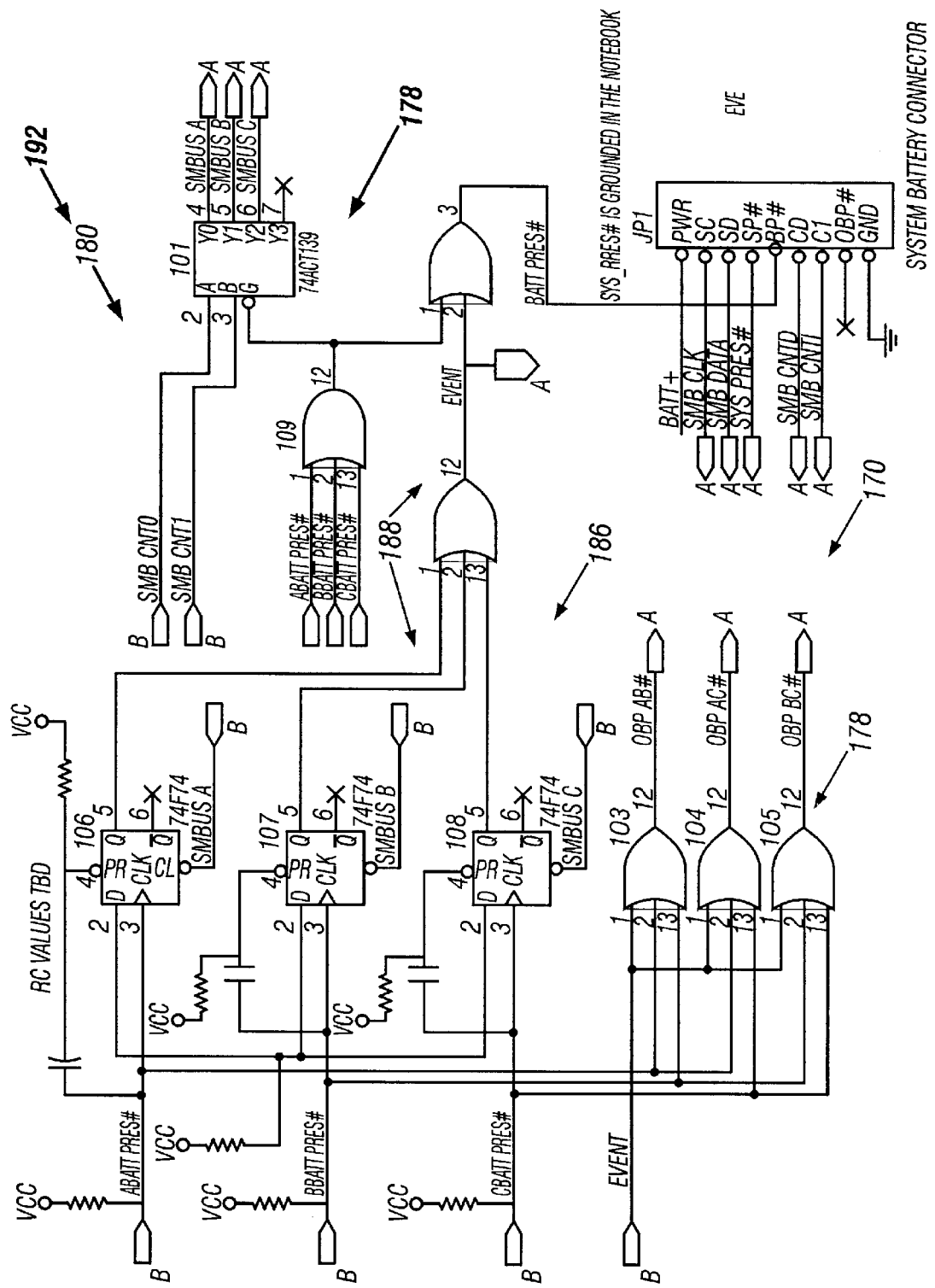
FIGS. 1A and 1B show a schematic diagram illustrating a system allowing use of multiple smart batteries substantially simultaneously coupled to the same smart bus.
Figure 1B:
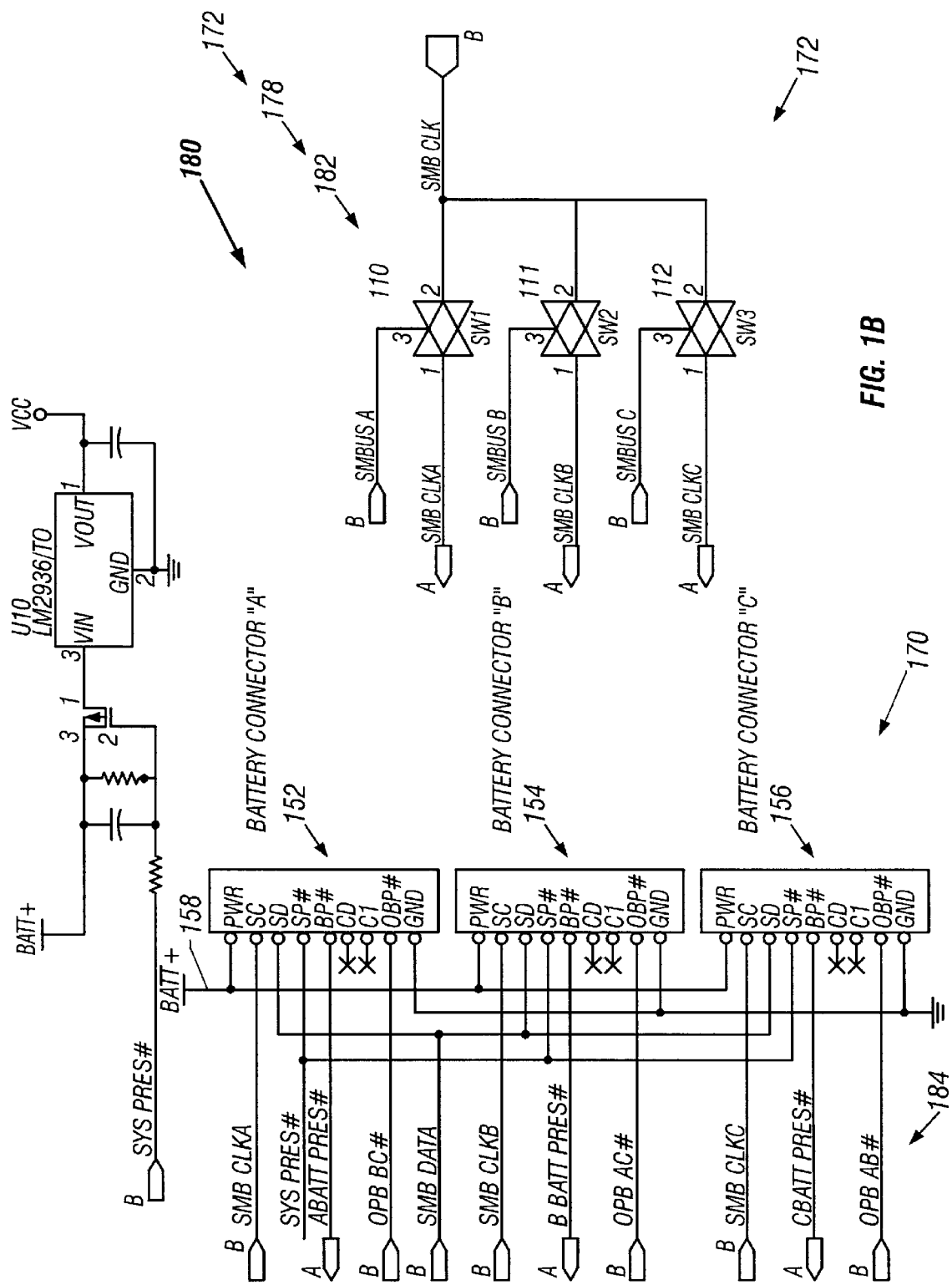

Referring now to FIGS. 1A and 1B, shown is a schematic diagram illustrating a system allowing use of multiple smart batteries substantially simultaneously coupled to the same smart bus. Depicted is one embodiment of circuitry 170 for detecting smart batteries connected to a smart battery bus. Shown is that in one embodiment, circuitry 170 for detecting smart batteries connected to a smart battery bus includes circuitry 184 for detecting the presence of battery present signals on at least two smart battery connectors. Illustrated is that, in one embodiment, circuitry 184 for detecting the presence of battery present signals on at least two smart battery connectors is such that when a smart battery is connected to either smart battery connector A 152, smart battery connector B 154, or smart battery connector C 156, the battery presence signal ABATT Pres#, BBATT Pres#, or CBATT Pres# respectively associated with the smart battery connector goes low (logical O; which in one implementation is approximately O volts). In another embodiment (not shown), circuitry 170 for detecting smart batteries connected to a smart battery bus includes circuitry for polling for the presence of battery present signals on at least two smart battery connectors.

Illustrated is that in one embodiment the battery presence signals ABATT Pres#, BBATT Pres#, or CBATT Pres# feed into circuitry 172 for selectively controlling at least one of the at least two smart batteries via isolation of the smart battery bus clock signal. Shown is that, in one embodiment, circuitry 172 for selectively controlling at least one of the at least two smart batteries via isolation of the smart battery bus clock signal includes circuitry 178 for isolating a smart battery connector from among at least two smart battery connectors. Depicted is that in one embodiment circuitry 178 for isolating a smart battery connector from among at least two smart battery connectors includes ABATT Pres#, BBATT Pres#, or CBATT Pres# signal fed into AND gate 109 which enables decoder 101 (note that, since decoder 101 is enabled low, so long as one of ABATT Pres#, BBATT Pres#, or CBATT Pres# is low decoder 101 will be enabled).

Depicted is that, in one embodiment, circuitry 178 for isolating a smart battery connector from among at least two smart battery connectors further includes circuitry 180 for coupling an SMBus clock signal of the data processing system to the SMBus clock line of the isolated smart battery connector. Illustrated is that, in one embodiment, circuitry 180 for coupling an SMBus clock signal of the data processing system to the SMBus clock line of the isolated smart battery connector includes circuitry 182 for switching the SMBus clock signal of the data processing system to the SMBus clock line of the isolated smart battery connector via a control signal from a processor. Shown is that, in one embodiment, circuitry 182 for switching the SMBus clock signal of the data processing system to the SMBus clock line of the isolated smart battery connector via a control signal from a processor includes isolation lines SMBUS A, SMBUS B, and SMBUS C which respectively feed to switches SW1 110, SW2 111, and SW3 112 which are respectively interposed between smart battery bus clock signal line SMB CLK and the smart battery bus clock signal lines SMB CLKA, SMB CLKB, and SMB CLKC respectively associated with smart battery connector A 152, smart battery connector B 154, and smart battery connector C 156.

Note that isolation lines SMBUS A, SMBUS B, and SMBUS C which respectively control switches SW1 110, SW2 111, and SW3 112 are such that—if decoder 101 is enabled (e.g., one of the battery presence lines is low)—the logical values respectively placed on decoder control lines SMB CNT0 and SMB CNT1 (e.g., 01, 10, 11) can be used to respectively enable SMB CLK to one battery SMB CLK line (e.g., SMB CLKA, SMB CLKB, or SMB CLKC) at a time by closing one of control switches SW1 110, SW2 111, or SW3 112 while keeping open the remaining (i.e., those other than the one closed) control switches SW1 110, SW2 111, or SW3 112.

Note that even though all battery data lines SMB DATA_A, SMB DATA_B, and SMB DATA_C are connected to the same system SMB DATA line, since only one of the batteries is switched to the SMB CLK clock signal, any other batteries (if present) can not see an official START condition (smart batteries require both their clock and data lines going low at the same time in order to "wake up" and communicate with a data processor) and therefore any other such smart batteries present—that is, those not connected to the system SMB CLK—will completely ignore all activity on the SMB DATA line.

In one implementation, decoder control lines SMB CNT0 and SMB CNT1 are supplied by a host data processing system, (e.g., via a control signal from a processor or via a control signal from a BIOS which has been appropriately modified to supply the requisite control signals). In another embodiment, circuitry 180 for coupling an SMBus clock signal of the data processing system to the SMBus clock line of the isolated smart battery connector includes circuitry (not shown) for switching the SMBus clock signal of the data processing system to the SMBus clock line of the isolated smart battery connector via a control signal from a programmable SMBus device.

Returning now to discussion of circuitry 170 for detecting smart batteries connected to a smart battery bus, illustrated is that in one embodiment, circuitry 170 for detecting smart batteries connected to a smart battery bus includes circuitry 186 for detecting the addition or removal of a smart battery. Shown is that in one embodiment circuitry 186 for detecting the addition or removal of a smart battery includes latches 106, 107, and 108 structured to provide alert to a change to a pre-existing system state by inhibiting battery presence to the system in the event a battery has either been inserted or removed subsequent to the determination of that pre-existing state (for example, if a previously present battery is removed from battery connector C 156). As the system switches the SMBus from battery to battery (i.e., activates isolation lines SMBUS A, SMBUS B, and SMBUS C and thereafter attempts communication through the SMBUS DATA_A, SMBUS DATA_B and SMBUS DATA_C, respectively) to determine batteries present, the fact that isolation lines SMBUS A, SMBUS B, and SMBUS C respectively feed into the clear (CL) of latches 106, 107, and 108 will cause each of the latches to respectively clear. Once the latch that was inhibiting the battery presence to the host has been cleared, the system will see the battery as being present again and will resume normal operation.

Depicted is that in one embodiment, circuitry 170 for detecting smart batteries connected to a smart battery bus includes circuitry 188 for initializing newly detected batteries into a mode which will not disrupt the system (i.e., into a "passive" state). Shown is that, in one embodiment, circuitry 188 for initializing newly detected batteries into a mode which will not disrupt the system includes of latches 106, 107, and 108 connected to force newly detected batteries into a dumb mode in which they will be discharging via a power Schottky diode and not allow charge or discharge unless the system indicates otherwise; that is, the latches function such that an initially detected battery is initialized such that it will not perform functions in the system until such detected battery is appropriately activated via decoder control lines SMB CNT0 and SMB CNT1. Shown is that in one embodiment, setting the batteries into the dumb mode is accomplished by the output of OR gate 102 going into OR gates 103, 104, and 105 whose respective outputs ODP AB#, ODP AC#, and ODP BC# respectively feed to battery connector C 156, battery connector B 154, and battery connector A 152. One advantage of the foregoing scheme is that it allows all batteries to be wire OR'd onto BATT+ rail 158 without fear of cross conduction. Once the batteries have been initialized into this mode, the system can choose to leave the batteries in this mode during discharge or it can select one of the batteries while disabling the others via the SMBus to discharge them serially, or it can select more than one battery to simultaneously discharge, if such is desired.

Note that in the foregoing described embodiments, if any of the batteries is present, then the SMBus gate will be enabled and the system will also get an indication of a battery being present. If it is desired to differentiate between a standard battery and the tray battery, one method for differentiating between the tray battery and the single battery is implemented by pulling up the decoder control lines in the tray battery and pulling them to ground in the single battery. Another approach is to simply poll for extra batteries in the system. For example if the single battery is installed, setting the decoder control lines to an unused state would isolate all battery communication in the event this is a tray battery. Consequently, if a single battery is in the system, the control lines set in the foregoing described fashion will not be able to isolate the SMBus and therefore have no effect on inhibiting communication.

As explained herein, the system shown in FIGS. 1A and 1B is merely one example of circuitry which can be utilized to effect an embodiment of a method for allowing a data processing system to use multiple smart batteries substantially simultaneously coupled to the same smart bus. A high level logic flowchart embodying the method appears in FIG. 2.

Figure 2:
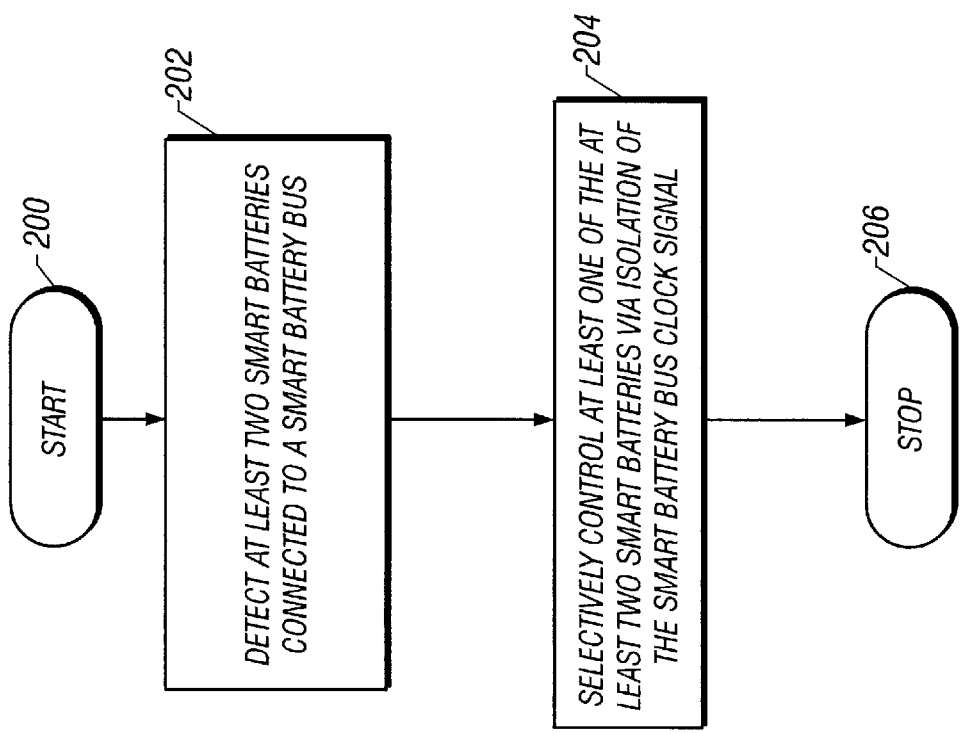
FIG. 2 depicts a high-level logic flowchart showing an embodiment of a method for allowing a data processing system to use multiple smart batteries substantially simultaneously coupled to the same smart bus.

With reference now to FIG. 2, illustrated is a high-level logic flowchart showing an embodiment of a method for allowing a data processing system to use multiple smart batteries substantially simultaneously coupled to the same smart bus. Method step 200 depicts the start of the process. Method step 202 shows detecting at least two smart batteries connected to a smart battery bus. Thereafter, method step 204 depicts selectively controlling at least one of the at least two smart batteries via isolation of the smart battery bus clock signal. Thereafter, method step 206 shows the end of the process.

Figure 3:
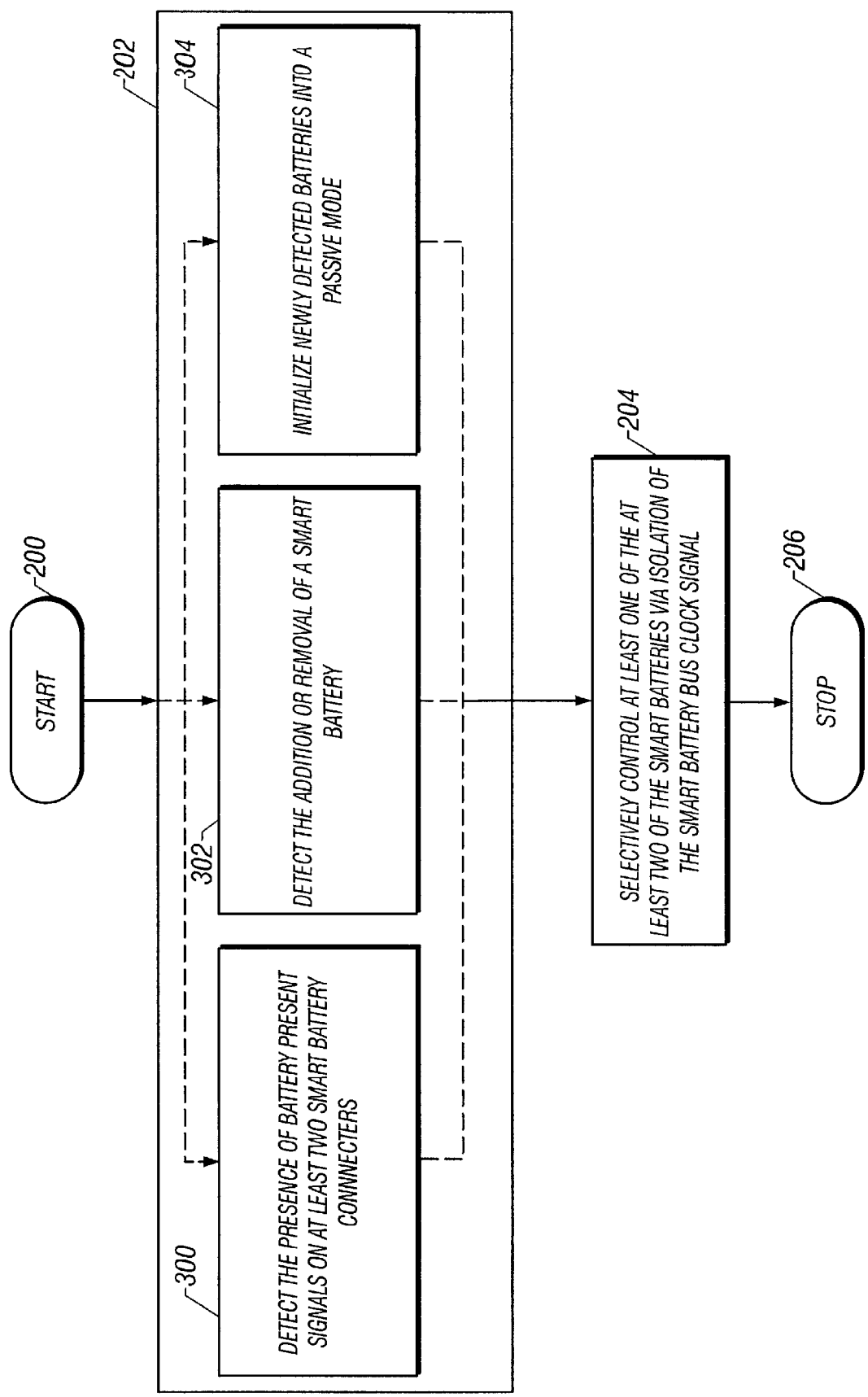
FIG. 3 illustrates the high-level logic flowchart of FIG. 2 wherein embodiments of method step 202 are depicted.

Referring now to FIG. 3, shown is the high-level logic flowchart of FIG. 2 wherein embodiments of method step 202 are depicted. Method step 300 illustrates detecting the presence of battery present signals on at least two smart battery connectors. Alternatively, method step 302 shows detecting the addition or removal of a smart battery. Again alternatively, method step 304 depicts initializing newly detected batteries into a passive mode. Note that in yet another embodiment, method steps 300, 302, and 304 are engaged in sequentially. The remaining method steps function in substantially the fashion as described previously.

Figure 4:
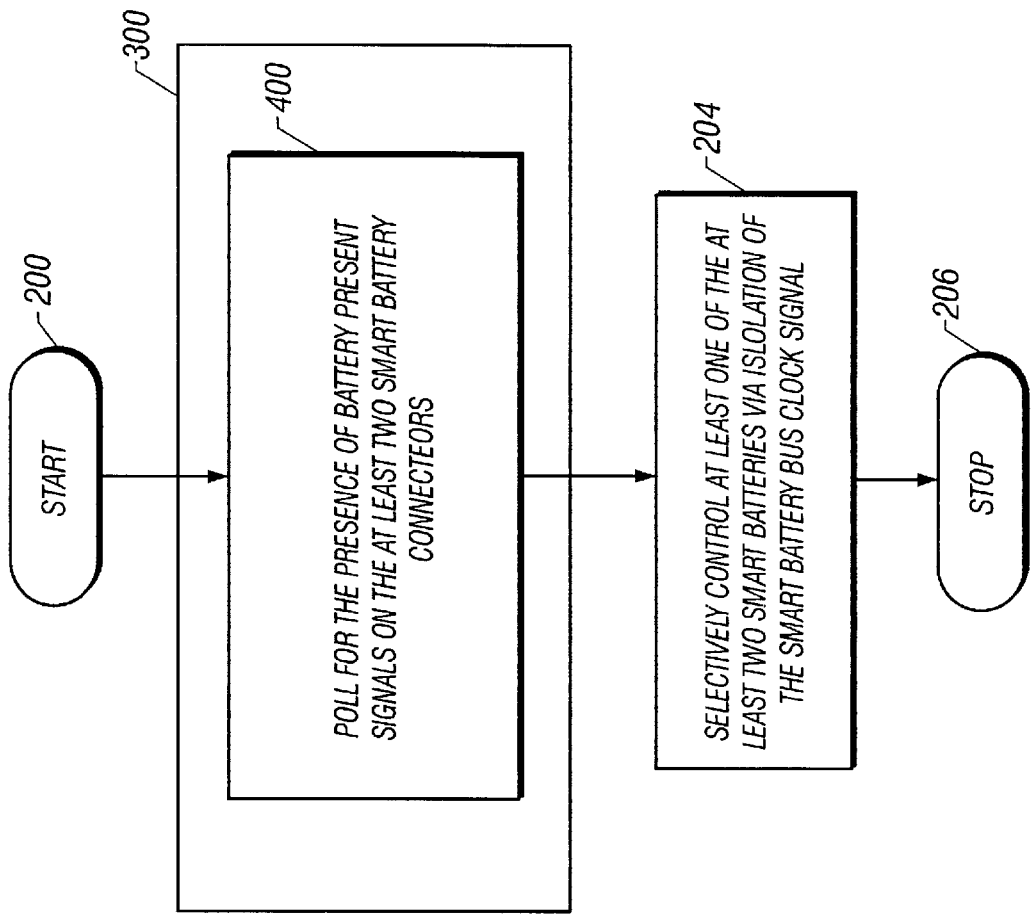
FIG. 4 shows a high-level schematic the high-level logic flowchart of FIG. 3 wherein an embodiment of method step 300 is illustrated.

With reference now to FIG. 4, depicted is the high-level logic flowchart of FIG. 3 wherein an embodiment of method step 300 is illustrated. Method step 400 shows polling for the presence of battery present signals on the at least two smart battery connectors. The remaining method steps function in substantially the fashion as described previously.

Figure 5:
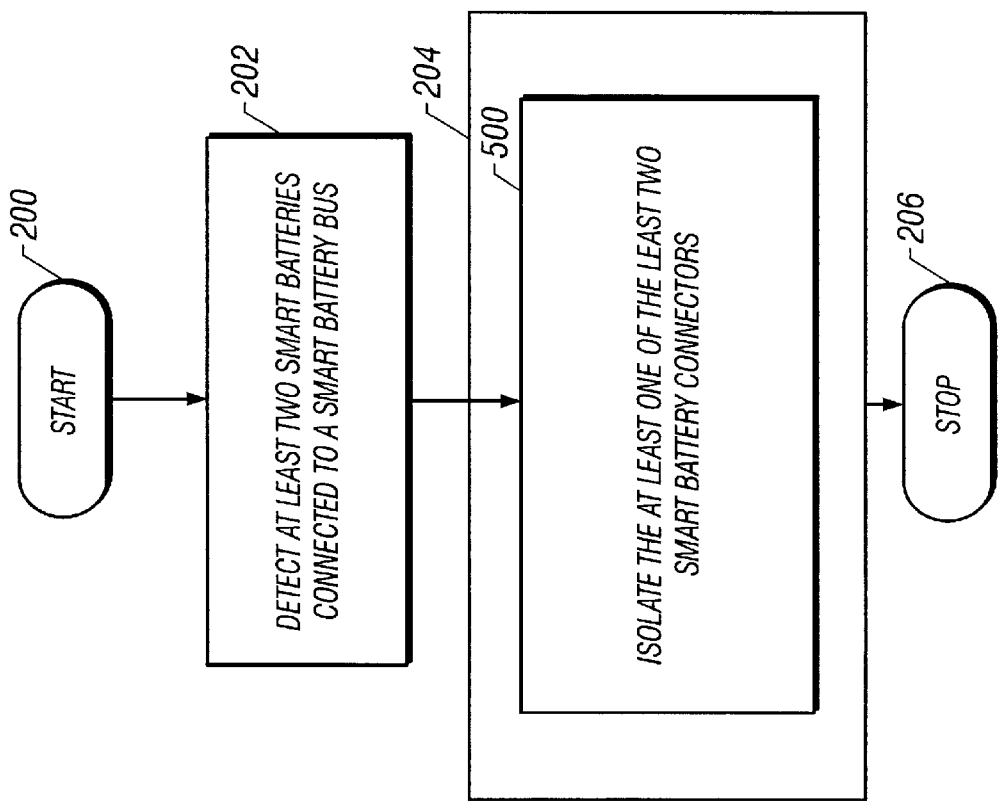
FIG. 5 depicts the high-level logic flowchart of FIG. 2 wherein an embodiment of method step 204 is shown.

Referring now to FIG. 5, illustrated is the high-level logic flowchart of FIG. 2 wherein an embodiment of method step 204 is shown. Method step 500 shows isolating the at least one of the at least two smart battery connectors. The remaining method steps function in substantially the fashion as described previously.

Figure 6:
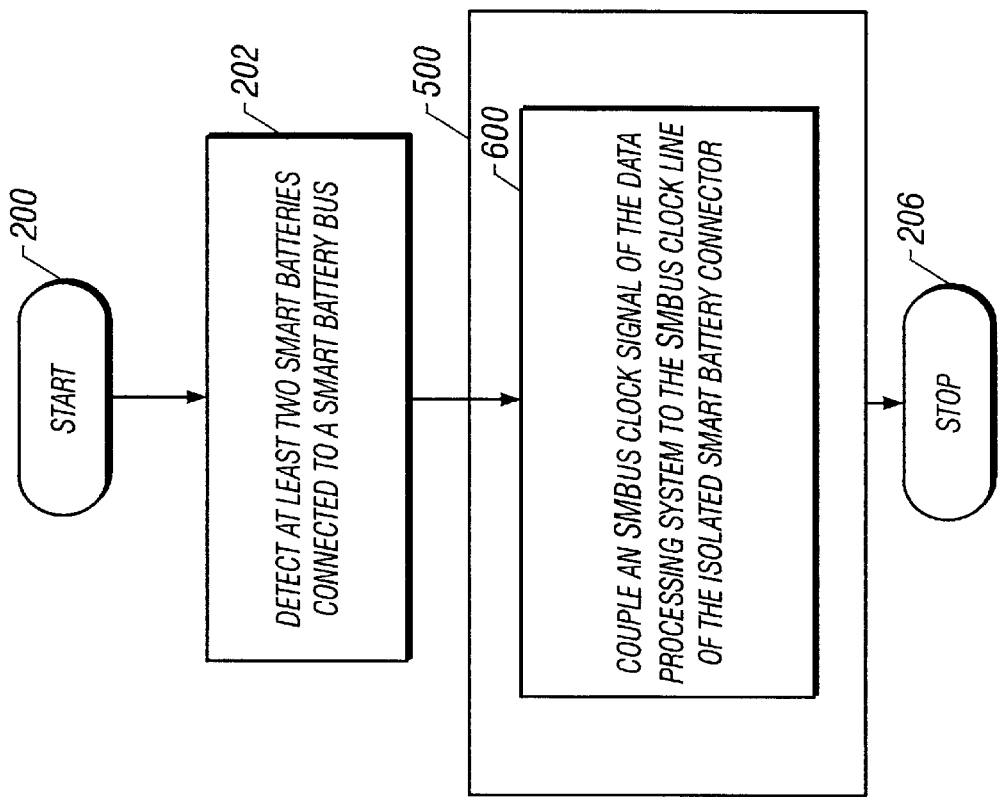
FIG. 6 illustrates the high-level logic flowchart of FIG. 5 wherein an embodiment of method step 600 is shown.

Referring now to FIG. 6, illustrated is the high-level logic flowchart of FIG. 5 wherein an embodiment of method step 500 is shown. Method step 600 depicts coupling an SMBus clock signal of the data processing system to the SMBus clock line of the isolated smart battery connector. The remaining method steps function in substantially the fashion as described previously.

Referring now to FIG. 7, illustrated is the high-level logic flowchart of FIG. 6 wherein embodiments of method step 600 is shown. Method step 700 depicts switching the SMBus clock signal of the data processing system to the SMBus clock line of the isolated smart battery connector via a control signal from a processor. Alternatively, method step 702 illustrates switching the SMBus clock signal of the data processing system to the SMBus clock line of the isolated smart battery connector via a control signal from a programmable SMBus device. The remaining method steps function in substantially the fashion as described previously.

Figure 8C:
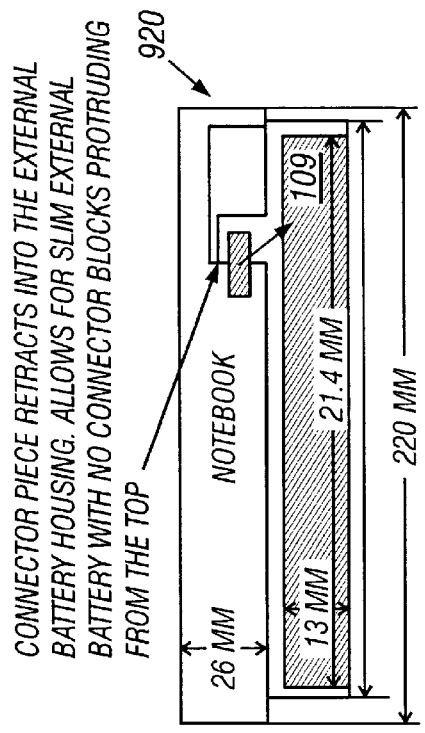
FIGS 8D–8D show various views of battery tray 204.
Figure 8B:
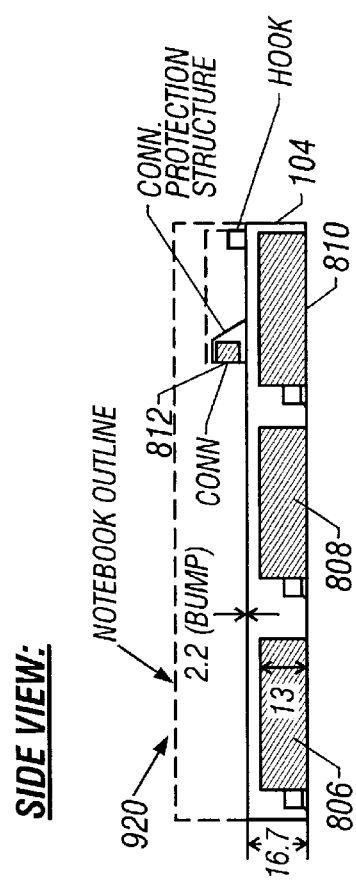
Figure 8D:
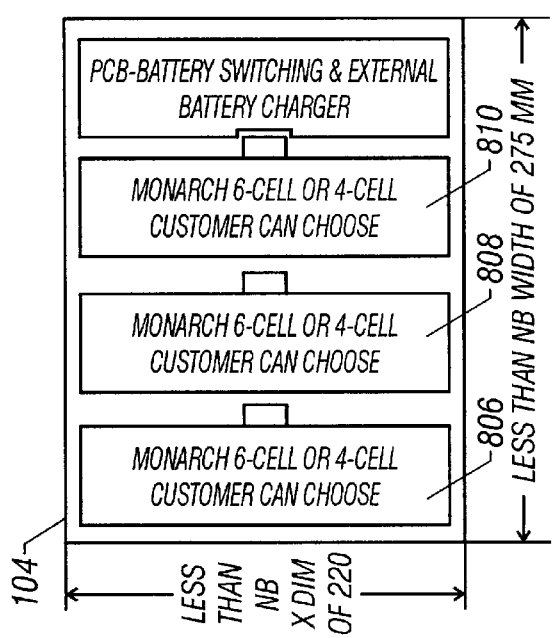
Figure 8A:
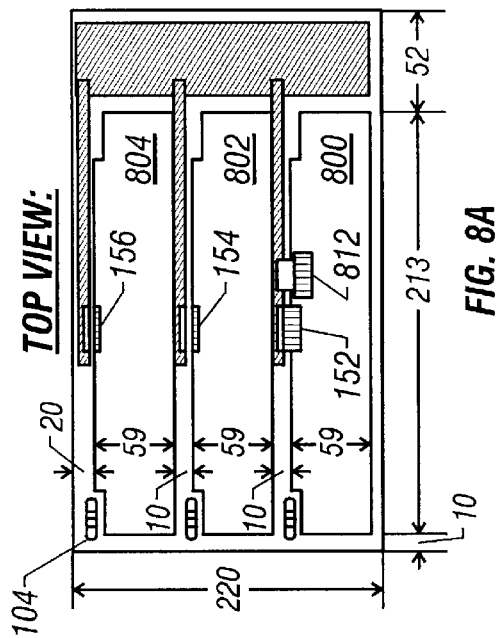

With reference now to FIGS. 8A–8D, shown are various views of battery tray 104. Shown in FIG. 8A is a top plan view of battery tray 104 having smart battery slots 800, 802, and 804, each respectively having smart battery connector A 152, smart battery connector B 154, and smart battery connector C 156. Also shown in FIG. 8A is system/tray battery coupling apparatus 812. Depicted in FIG. 8B is a top plan view of battery tray 104 having smart batteries 806, 808, and 810 each respectively inserted in smart battery slots 800, 802, and 804, such that the smart battery connectors are each operably coupled (e.g., via respective mating) with smart battery connector A 152, smart battery connector B 154, and smart battery connector C 156. Illustrated in FIG. 8C is a first-side plan view of battery tray 104 illustrating an embodiment of battery tray 104 within the confines of data processing system 920 (described herein), wherein is shown a tray battery coupling apparatus which in one embodiment is a docking connection and which in another embodiment is a battery/media bay connection). Shown in FIG. 8D is a second-side plan view of battery tray 104 illustrating an embodiment of battery tray 104 within the confines of data processing system 920 (described herein) wherein is shown a tray battery coupling apparatus which is a is a docking connection (in another embodiment (not shown), the tray battery coupling apparatus 812 is a battery/media bay connection).

As noted in the foregoing discussion, the embodiments described herein take advantage of existing battery design. By taking advantage of the existing battery design, a tray can be developed to hold 1, 2, or 3 batteries. This tray will contain the circuitry to handle the battery switching for charge and discharge and may or may not contain the circuitry for the external battery charger. The tray also has a connector on it that will fit into the bay of the standard battery in the bottom of the notebook.

It has been found that a battery tray designed in the fashion described herein can be made from a relatively few low cost components on a small printed circuit board (PCB). Except for the unit cost of about $50 per standard factor smart battery, the total electrical component cost for this solution is approximately $5 (not including plastics and connectors). The solution described herein is, thus, much cheaper (e.g., approximately $50 cheaper) and easier to manufacture than a single super battery with a component cost in excess of $200. In addition, beyond the straight cost advantage, additional cost benefits are generated in that there is no need to inventory a custom form factor battery.

Those skilled in the art will recognize that the state of the art has progressed to the point where there is little distinction left between hardware and software implementations of aspects of systems; the use of hardware or software is generally a design choice representing cost versus efficiency tradeoffs. The foregoing detailed description has set forth various embodiments of the devices and/or processes via the use of block diagrams, flowcharts, and examples. Insofar as such block diagrams, flowcharts, and examples contain one or more functions and/or operations, it will be understood as notorious by those within the art that each function and/or operation within such block diagrams, flowcharts, or examples can be implemented, individually and/or collectively, by a wide range of hardware, software, firmware, or any combination thereof. In one embodiment, the present invention may be implemented via Application Specific Integrated Circuits (ASICs). However, those skilled in the art will recognize that the embodiments disclosed herein, in whole or in part, can be equivalently implemented in standard Integrated Circuits, as a computer program running on a computer, as a program running on a processor, as firmware, or as virtually any combination thereof and that designing the circuitry and/or writing the code for the software or firmware would be well within the skill of one of ordinary skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of a signal bearing media include but are not limited to the following: recordable type media such as floppy disks, hard disk drives, CD ROMs, digital tape, and transmission type media such as digital and analogue communication links using TDM or IP based communication links (e.g., packet links).

In a general sense, those skilled in the art will recognize that the various embodiments described herein which can be implemented, individually and/or collectively, by a wide range of hardware, software, firmware, or any combination thereof can be viewed as being composed of various types of "electrical circuitry." Consequently, as used herein "electrical circuitry" includes but is not limited to electrical circuitry having at least one discrete electrical circuit, electrical circuitry having at least one integrated circuit, electrical circuitry having at least one application specific integrated circuit, electrical circuitry forming a general purpose computing device configurable by a computer program (e.g., a general purpose computer configurable by a computer program or a microprocessor configurable by a computer program), electrical circuitry forming a memory device (e.g., any and all forms of random access memory), and electrical circuitry forming a communications device (e.g., a modem, communications switch, or optical-electrical equipment).

Figure 9:
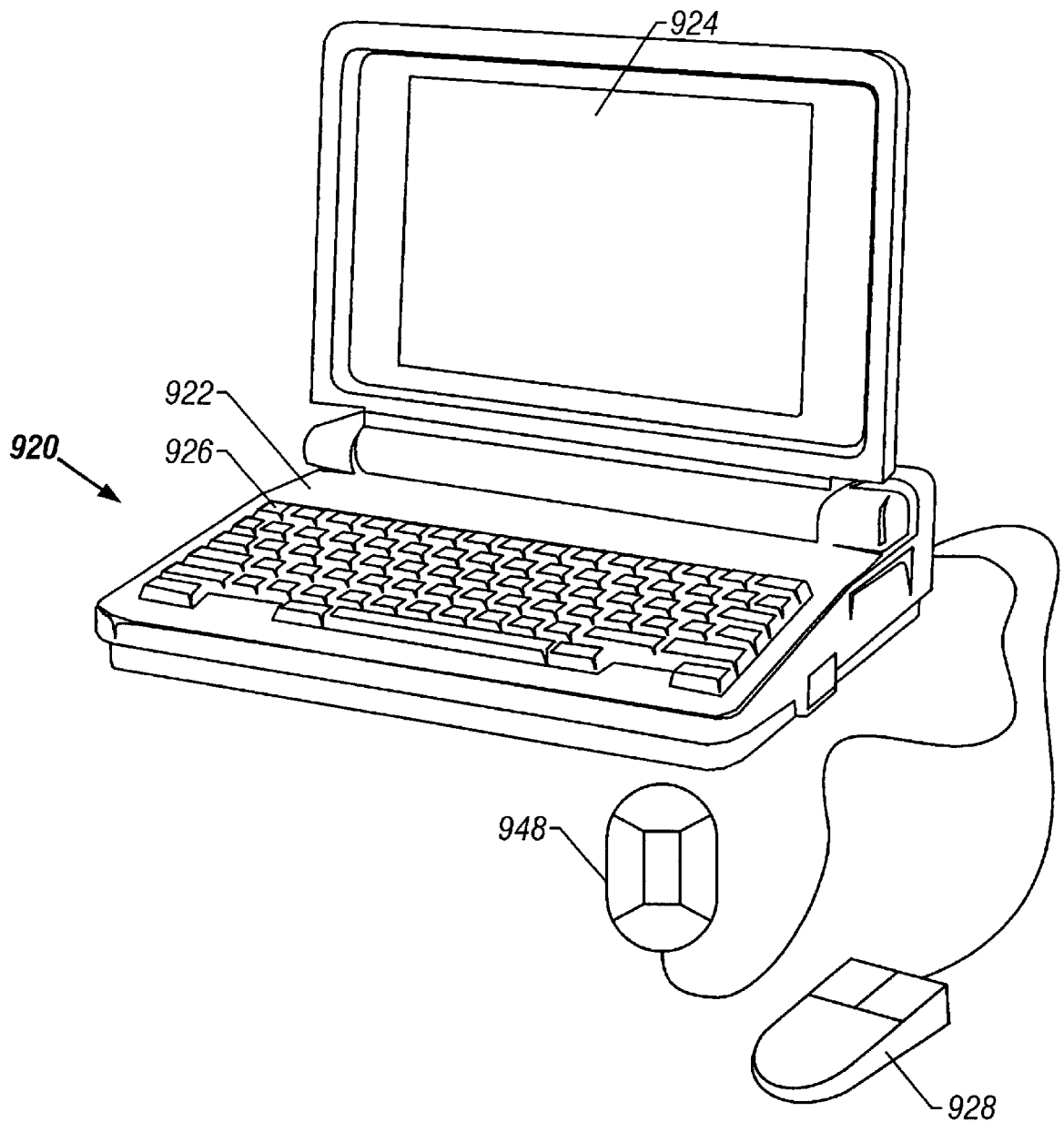
FIG. 9 shows selected components of data processing system 920 in which illustrative embodiments of the devices and/or processes described herein may be implemented.
Figure 10:
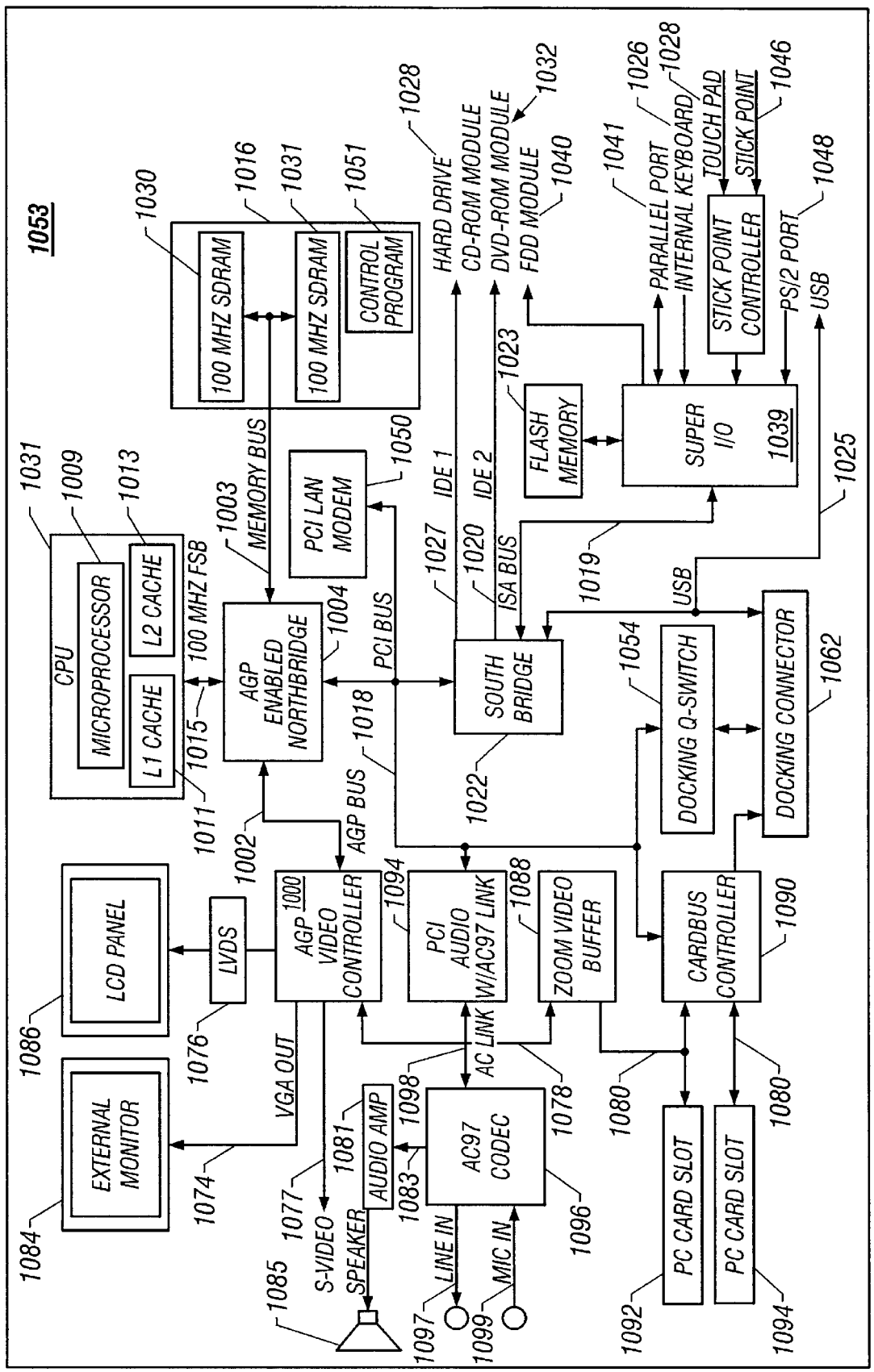
FIG 10 depicts selected components of data processing system 920 in which illustrative embodiments of the devices and/or processes described herein may be implemented.

Those skilled in the art will recognize that it is common within the art to describe devices and/or processes in the fashion set forth above, and thereafter use standard engineering practices to integrate such described devices and/or processes into data processing systems. That is, the devices and/or processes described above can be integrated into data processing system via a reasonable amount of experimentation. FIGS. 9 and 10 show an example representation of a data processing system into which the described devices and/or processes may be implemented with a reasonable amount of experimentation.

With reference now to FIG. 9, depicted a pictorial representation of a conventional data processing system in which illustrative embodiments of the devices and/or processes described herein may be implemented. It should be noted that a graphical user interface systems (e.g., Microsoft Windows 98 or Microsoft Windows NT operating systems) and methods can be utilized with the data processing system depicted in FIG. 9. Data processing system 920 is depicted which includes system unit housing 922, video display device 924, keyboard 926, mouse 928, and microphone 948. Data processing system 920 may be implemented utilizing any suitable computer such as a DELL portable computer system, a product of Dell Computer Corporation, located in Round Rock, Tex.; Dell is a trademark of Dell Computer Corporation.

Referring now to FIG. 10, depicted is a data processing system motherboard 1053 having selected components of data processing system 920 in which illustrative embodiments of the devices and/or processes described herein may be implemented. Data processing system 920 includes Central Processing Unit ("CPU") 1031 (wherein are depicted microprocessor 1009, L1 Cache 1011, and L2 Cache 1013). CPU 1031 is coupled to CPU bus 1015.

CPU bus 1015 is coupled to AGP-enabled Northbridge 1004, which serves as a "bridge" between CPU bus 1015, AGP interconnect 1002 (a type of data bus), and system memory bus 1003. In going from one type of bus to another type of bus, a "bridge" is generally needed because the two different type buses speak a different "language." The term "AGP-enabled" is intended to mean that the so-referenced components are engineered such that they interface and function under the standards defined within the AGP interface specification (Intel Corporation, Accelerated Graphics Port Interface Specification).

Generally, each bus in a system utilizes an independent set of protocols (or rules) to conduct data, which are generally set forth in a product specification uniquely tailored to the type of bus in question (e.g., the PCI local bus specification and the AGP interface specification). These protocols are designed into a bus directly and such protocols are commonly referred to as the "architecture" of the bus. In a data transfer between different bus architectures, data being transferred from the first bus architecture may not be in a form that is usable or intelligible by the receiving second bus architecture. Accordingly, communication problems may occur when data must be transferred between different types of buses, such as transferring data from a PCI device on a PCI bus to a CPU on a CPU bus. Thus, a mechanism is developed for "translating" data that are required to be transferred from one bus architecture to another. This translation mechanism is normally contained in a hardware device in the form of a bus-to-bus bridge (or interface) through which the two different types of buses are connected. This is one of the functions of AGP-enabled Northbridge 1004, as well as the Southbridge 1022, in that it is to be understood that such bridges can translate and coordinate between various data buses and/or devices which communicate through the bridges.

AGP interconnect 1002 interfaces with AGP-enabled graphics controller 1000, which interconnects with video display device 924 via video display bus 1014. AGP-enabled graphics controller 1000 also interconnects with video display device 924 via video display bus 1017.

AGP-enabled Northbridge 1004 interfaces with system memory bus 1003. System memory bus 1003 interfaces with system memory 1016, which can contain various types of memory devices such as DRAM chip 1030, but which also can contain synchronous DRAM, Rambus DRAM, other type memory chips. In addition, shown for sake of illustration is that data processing system 920 includes control program 1051 which resides within system memory 1016 and which is executed and/or operated on by CPU 1031. Control program 1051 contains instructions that when executed on CPU 1031 carries out application program (e.g., videoconferencing software) operations.

AGP-enabled Northbridge interfaces with Peripheral Component Interconnect (PCI) bus 1018, upon which are shown various PCI Input-Output (I/O) devices 1050, 1052, and 1054. Peripheral Component Interconnect (PCI) bus 1018 interfaces with Southbridge 1022.

Southbridge 1022 serves as a bridge between PCI bus 1018 and I/O (or ISA) bus 1019, 1394 Device 1025, and network card 1027. I/O bus 1019 interfaces with ROM 1021, which for sake of illustration is shown containing system BIOS 1023.

I/O bus 1019 interfaces with I/O controller 1039 for connecting peripheral devices (e.g., disk and tape drives 1033) to 110 bus 1019. I/O controller 1039 interfaces with user interface adapter 1040 for connecting keyboard 926, mouse 928, speaker 946, microphone 948, and/or other user interface devices, such as a touch screen device (not shown), to I/O bus 1019 through I/O controller 1039.

Video display device 924 is the visual output of data processing system 920, which can be a CRT-based video display well-known in the art of computer hardware. However, with a portable or notebook-based computer, video display device 924 can be an LCD-based, or a gas plasma-based, or any other type of flat-panel display.

Any suitable machine-readable media may retain the graphical user interface, such as DRAM 1030, ROM 1021, a magnetic diskette, magnetic tape, or optical disk (the last three being located in disk and tape drives 1033). Any suitable operating system such as one having an associated graphical user interface (e.g., Microsoft Windows or Microsoft NT) may direct CPU 1031. Other technologies can also be utilized in conjunction with CPU 1031, such as touch-screen technology or human voice control.

Those skilled in the art will appreciate that the hardware depicted in FIG. 10 may vary for specific applications. For example, other peripheral devices such as optical disk media, audio adapters, video cameras such as those used in videoconferencing, or programmable devices, such as PAL or EPROM pro-ramming devices well-known in the art of computer hardware, and the like may be utilized in addition to or in place of the hardware already depicted.

The foregoing, described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that if a specific number of an introduced claim element is intended, such an intent will be explicitly recited in the claim, and in the absence of such recitation no such intent is present. For example, as an aid to understanding, the following appended claims may contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use of definite articles used to introduce claim elements. In addition, even if a specific number of an introduced claim element is explicitly recited, those skilled in the art will recognize that such recitation should typically be interpreted to mean at least the recited number (e.g., the bare recitation of "two elements," without other modifiers, typically means at least two elements, or two or more elements).

What is claimed is:

1. A data processing system allowing use of multiple smart batteries substantially simultaneously coupled to the same smart bus, said data processing system comprising:

circuitry for detecting at least two smart batteries connected to a smart battery bus, wherein said circuitry for detecting includes one or more electrical circuits selected from the group including but not limited to electrical circuits having at least one discrete circuit, electrical circuits having at least one integrated circuit, electrical circuits having at least one application specific integrated circuit, and electrical circuits providing a general purpose computing device configurable by a computer program;

circuitry for selectively controlling at least one of the at least two smart batteries via isolation of the smart battery bus clock signal, said circuitry for selectively controlling operably coupled to said circuitry for detecting, wherein said circuitry for selectively controlling includes one or more electrical circuits selected from the group including but not limited to electrical circuits having at least one discrete circuit, electrical circuits having at least one integrated circuit, electrical circuits having at least one application specific integrated circuit, and electrical circuits providing a general purpose computing device configurable by a computer program,; and at least one of said circuitry for detecting and said circuitry for selectively controlling operably coupled, either directly or through one or more intermedial circuits, to at least one data processing system component selected from the group comprising a processor device, a display device, a memory device, and a communication device.

2. The data processing system of claim 1, further comprising:

said circuitry for selectively controlling operably coupled to a tray battery coupling apparatus, the tray battery coupling apparatus selected from the group comprising a docking connection and a battery/media bay connection; and the tray battery coupling apparatus integrated into a battery tray for holding the at least two smart batteries.

3. The data processing system of claim 1, wherein said circuitry for detecting at least two smart batteries connected to a smart battery bus further comprises:

circuitry for detecting the presence of battery present signals on at least two smart battery connectors.

4. The data processing system of claim 3, wherein said circuitry for detecting the presence of the at least two smart battery connectors further comprises:

circuitry for polling for the presence of battery present signals on the at least two smart battery connectors.

5. The data processing system of claim 1, wherein said circuitry for detecting at least two smart batteries connected to a smart battery bus further comprises:

circuitry for detecting the addition or removal of a smart battery.

6. The data processing system of claim 1, wherein said circuitry for detecting at least two smart batteries connected to a smart battery bus further comprises:

circuitry for initializing newly detected batteries into a passive mode.

7. The data processing system of claim 1, wherein said circuitry for selectively controlling at least one of the at least two smart batteries via isolation of the smart battery bus clock signal further comprises:

circuitry for isolating the at least one of the at least two smart batteries.

8. The data processing system of claim 7, wherein said circuitry for isolating a smart battery connector from among at least two smart battery connectors further comprises:

circuitry for coupling an SMBus clock signal of the data processing system to the SMBus clock line of the isolated smart battery connector.

9. The data processing system of claim 8, wherein said circuitry for coupling an SMBus clock signal of the data processing system to the SMBus clock line of the isolated smart battery connector further comprises:

circuitry for switching the SMBus clock signal of the data processing system to the SMBus clock line of the isolated smart battery connector via a control signal from a processor.

10. The data processing system of claim 8, wherein said circuitry for coupling an SMBus clock signal of the data processing system to the SMBus clock line of the isolated smart battery connector further comprises:

circuitry for switching the SMBus clock signal of the data processing system to the SMBus clock line of the isolated smart battery connector via a control signal from a programmable SMBus device.

11. A method for allowing a data processing system to use multiple smart batteries substantially simultaneously coupled to the same smart bus, said method comprising:

detecting at least two smart batteries connected to a smart battery bus; and selectively controlling at least one of the at least two smart batteries via isolation of the smart battery bus clock signal.

12. The method of claim 11, wherein said detecting at least two smart batteries connected to a smart battery bus further comprises:

the at least two smart batteries located within a battery tray for holding the at least two smart batteries.

13. The method of claim 11, wherein said detecting at least two smart batteries connected to a smart battery bus further comprises:

detecting the presence of battery present signals on at least two smart battery connectors.

14. The method of claim 13, wherein said detecting the presence of the at least two smart battery connectors further comprises:

polling for the presence of battery present signals on the at least two smart battery connectors.

15. The method of claim 11, wherein said detecting at least two smart batteries connected to a smart battery bus further comprises:

detecting the addition or removal of a smart battery.

16. The method of claim 11, wherein said detecting at least two smart batteries connected to a smart battery bus further comprises:

initializing newly detected batteries into a passive mode.

17. The method of claim 11, wherein said selectively controlling at least one of the at least two smart batteries via isolation of the smart battery bus clock signal further comprises:

isolating the at least one of the at least two smart batteries.

18. The method of claim 17, wherein said isolating a smart battery connector from among at least two smart battery connectors further comprises:

coupling an SMBus clock signal of the data processing system to the SMBus clock line of the isolated smart battery connector.

19. The method of claim 18, wherein said coupling an SMBus clock signal of the data processing system to the SMBus clock line of the isolated smart battery connector further comprises:

switching the SMBus clock signal of the data processing system to the SMBus clock line of the isolated smart battery connector via a control signal from a processor.

20. The method of claim 18, wherein said coupling an SMBus clock signal of the data processing system to the SMBus clock line of the isolated smart battery connector further comprises:

switching the SMBus clock signal of the data processing system to the SMBus clock line of the isolated smart battery connector via a control signal from a programmable SMBus device.

* * * * *